Feb. 13, 1962  P. W. BRAKELEY  3,020,584
APPARATUS AND METHOD FOR FORMING FLOOR TILE
Filed Dec. 6, 1957  2 Sheets-Sheet 1
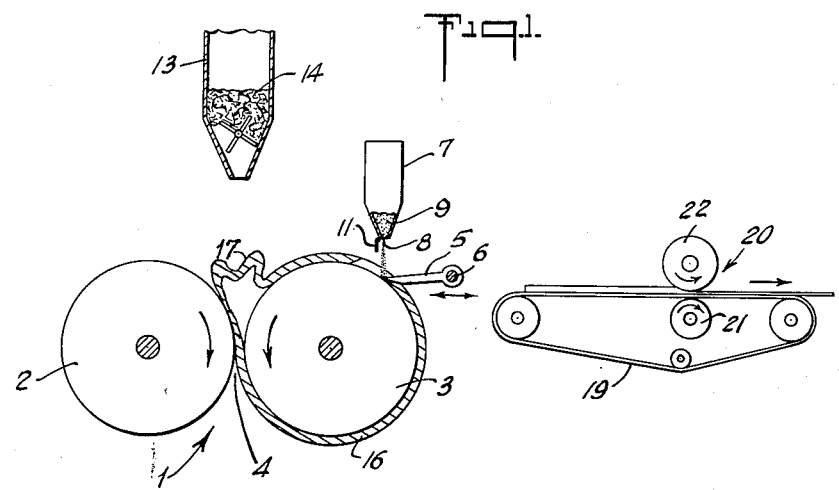
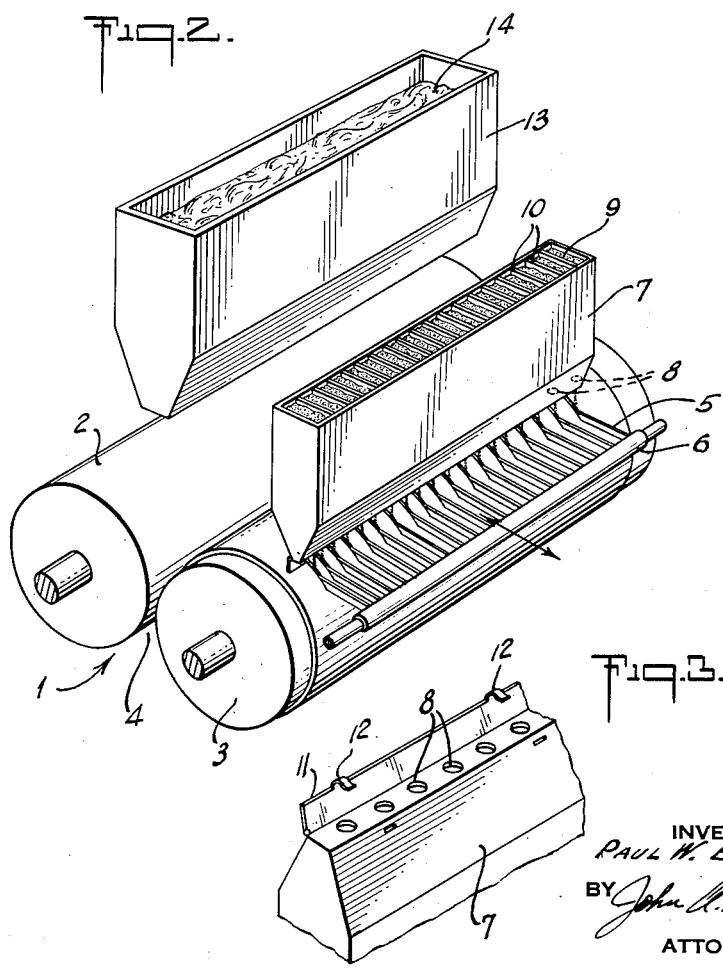
INVENTOR
PAUL W. BRAKELEY
BY John A. McKinney
ATTORNEY Feb. 13, 1962 P. W. BRAKELEY 3,020,584
APPARATUS AND METHOD FOR FORMING FLOOR TILE
Filed Dec. 6, 1957 2 Sheets-Sheet 2
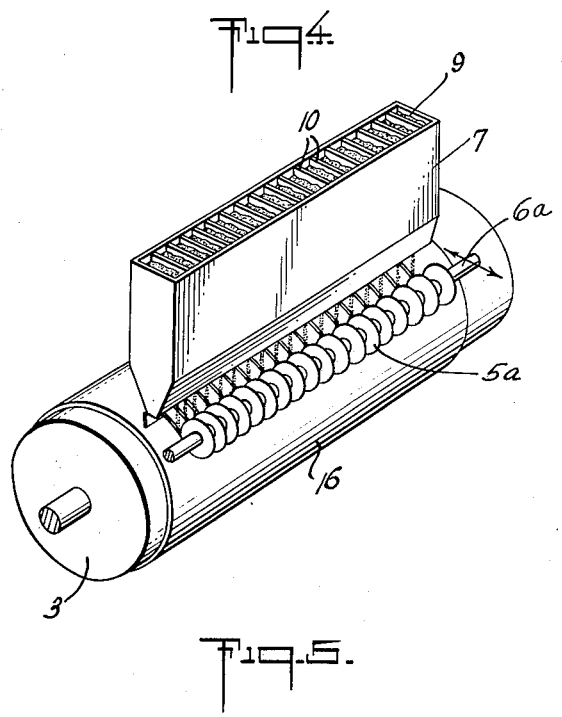
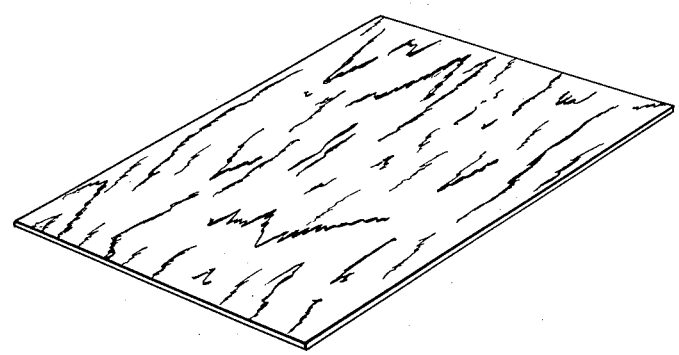
INVENTOR
PAUL W. BRAKELEY
BY
ATTORNEY

United States Patent Office 3,020,584
Patented Feb. 13, 1962

3,020,584
APPARATUS AND METHOD FOR
FORMING FLOOR TILE
Paul W. Brakeley, Plainfield, N.J., assignor to Johns-Manville Corporation, New York, N.Y., a corporation of New York
Filed Dec. 6, 1957, Ser. No. 701,004
15 Claims. (Cl. 18—2)

This invention relates to a new method and apparatus for the production of thermoplastic surface covering materials of an improved and novel design or color configuration, and it is particularly directed to a method of producing floor or wall covering materials, such as sheets or tiles and the like, having a true "marbleized" graining.

Thermoplastic surface covering materials such as the commonly known asphalt, vinyl, rubber, etc. tiles or sheets are well known products. Such materials are conventionally composed of a binder consisting of one of the above-mentioned plastic materials, reinforcing fibers, various fillers and coloring pigments. In general, they are manufactured by heating and mixing the ingredients to produce a thermoplastic mass of base material, milling the mass on a mill, such as, for example, a two roll rubber mill, an inverted four roll L or a three roll calender, to form a blank or slab and calendering the same.

One of the major problems in the industry has been in the development of techniques and/or means of incorporating and/or reproducing color designs or configurations in such thermoplastic sheets or tiles. Efforts along this line have produced the well known, so called, "marbleized" article which consists of random and irregular streaks, splotches or blobs of one or more colors, or combination of colors, in a sheet or tile background of a different color. Conventional "marbleizing" of such products is obtained by dropping relatively large, broken-up particles or pieces of thermoplastic tile or other suitable color imparting materials, of one or more colors different from that of the thermoplastic batch, upon the back mill roll or in the bank of base material which forms in the nip between the rolls of the mill. The granules, pieces or particles of thermoplastic "marbleizing" or color imparting material, known in the art as "splash" or "mottle," are mixed with the base material on the mill for a period sufficient to heat soften the thermoplastic splash particles and distribute them throughout the mix. Subsequent calendering streaks many of the heat softened splash particles to produce the well known design commonly called "marbleized." However, this process has limitations in quantity production, namely, precise control of operating conditions, in order to produce the sheets or tiles having substantially uniform or consistent color designs or configurations. Furthermore, this method provides no means of modifying or changing the design or configuration. Various methods have been tried or developed in an effort to improve existing "marbleizing" techniques and to develop new designs or configurations. U.S. Patent No. 2,314,062, for example, describes a method and apparatus for producing a conventional "marbleized" tile with a more uniform distribution of the streaks and splotch color design or configuration throughout the product. However, all such methods have failed to produce a design or configuration substantially different and distinctive in appearance, as desired for the purposes of this invention.

An object of this invention is to provide a novel and different product, a finely veined or grained thermoplastic surface covering material resembling natural marble.

The principal object of this invention is to provide a method and apparatus for reproducing the fine veining or graining of natural marble in thermoplastic surface covering materials.

A further o'ject of this invention is a method and apparatus which permits the controlled application of splash or other granular coloring material whereby consistently uniform and evenly distributed fine waving veins resembling natural marble may be incorporated in, and substantially entirely through, thermoplastic materials.

A further object of this invention is to provide a method and means for the production of a designed tile resulting in a substantial saving in the amount of splash usage.

A further object of this invention is to provide a method for the manufacture of designed tile or sheet surface covering materials which permits a high recovery of uniformly designed or configurated products due to uniform splash application.

A still further object of this invention is to provide a method for the manufacture of designed surface covering products whereby color poisoning is reduced to a minimum due to decreased splash usage, thus achieving a substantial saving in the amount of pigment required to overcome color poisoning.

These and other objects and advantages will become apparent and will be more fully understood from a consideration of the following detailed description of the invention, taken in connection with the drawing, in which:

FIG. 1 is a diagrammatic view, partially in section, illustrating one form of apparatus and the method of carrying out the invention;

FIG. 2 is a pictorial view illustrating, in part, the same apparatus as shown in FIG. 1;

FIG. 3 is a pictorial view illustrating in detail a suitable feed control means;

FIG. 4 is a pictorial view, similar to FIG. 2, illustrating the preferred cutting means; and FIG. 5 is a pictorial view of an article illustrating the design produced in accordance with this invention.

In the drawing similar numerals of reference illustrate similar parts in the several views.

This invention is applicable to the manufacture of any of the various types of thermoplastic surface coverings, including asphalt compositions of the type commonly employed in the production of floor and wall covering, so called synthetic resin type plastic compositions, rubber compositions, and the like. The invention is particularly useful in the manufacture of surface covering of the vinyl resin type. Also, the surface coverings of this invention may be produced in the form of sheets, blocks, tiles, and the like; the physical shape or form of the finished product is not considered to be a part of the invention.

In part, the process of this invention may be carried out on, and the apparatus may consist of, a conventional two roll rubber mill. Referring to the drawings, and particularly to FIG. 1, such a mill, generally referred to as 1, is composed of two heated adjacent horizontal rolls 2 and 3 which counter rotate as indicated by the arrows. One roll of the mill, 3, which will hereinafter be referred to as the front roll, is maintained at a temperature sufficiently different from that of the back roll 2, to cause the thermoplastic material 16 to adhere only to the front roll 3. This type of mill is generally employed for mixing plastic materials and milling the same out into a blanket or slab about the front roll in a thickness or depth approximately the same as the distance between the two adjacent rolls. Accordingly, blankets or slabs of thermoplastic materials may be obtained in various thicknesses or depths by adjusting the distance 4 between the rolls 2 and 3.

In conventional procedures, a large mass of thermoplastic base material 14, prepared in mixer 13, is deposited between the hot rolls 2 and 3 of the counter rotating mill and upon milling, forms a large rolling or folding bank of reverse or excess material between the rolls, i.e. in the nip, as well as a blanket or slab 16 about the front roll 3. The revolving action of the mill causes the blanket or slab to be placed into contact with the bank in the nip between rolls which produces a mixing or kneading action resulting in homogeneity of the mass as well as sheeting of the material into a blanket or slab.

In accordance with the present invention, a batch of any conventional type of thermoplastic material 14 suitable for use as a surface covering, such as a vinyl base floor tile mix, and of any desired base color is prepared in accordance with well known procedures, such as heating and mixing of the ingredients, in mixer 13. The batch, or a part thereof, is deposited on the mill rolls 2 and 3 for milling and the forming of a continuous blanket or slab 16 about the front mill roll 3. Since a bank of reserve or excess thermoplastic base material of any substantial size, such as the amount of banking material conventionally employed in the manufacture of similar articles, will defeat the objects and/or advantages of this invention, it is essential that the rolling or folding bank 17, if any, does not exceed a maximum height of approximately 4 inches, measured from the common horizontal tangent to the two rolls. Therefore, it is necessary either that the deposited batch be proportioned in an amount just sufficient to form a continuous blanket or slab about the front roll 3 of the mill 1 or that after milling, if necessary, excess material be removed from the nip of the mill in an amount sufficient to reduce the bank to a maximum of not more than approximately 4 inches of excess material above the common tangent thereby producing a proper working bank. However, the preferred size of the rolling or folding bank 17 may vary anywhere between ½ to 4 inches of nip height depending on the temperature and consistency of the thermoplastic material as well as on the thickness of the slab or blanket formed, i.e. the distance 4 between the mill rolls. Subsequent to forming a satisfactory blanket of thermoplastic material 16 on the front roll 3 of the mill 1 in accordance with the foregoing, a pluraltiy of spaced parallel grooves or slits are cut through the blanket and powdered splash coloring material 9, of any desired color or colors, is poured or fed into the opened grooves or slices. The blanket and added splash are then milled, removed from the mill, calendered to the desired thickness, and cut into suitable sizes or shapes.

In order to insure satisfactory and consistent reproduction of the fine veining or graining of natural marble in a thermoplastic surface covering material, the grooves or slits cut into the blanket should be approximately $\frac{3}{32}$ to ½ of an inch in width and spaced approximately ¼ to 1 inch apart, preferably ⅜ of an inch apart. Furthermore, in order to produce a product of uniform and consistent color design or configuration entirely through the sheet or slab of thermoplastic material, the grooves or slits cut into the blanket should extend substantially entirely through the same.

The granular splash 9 may be added simultaneously with the cutting of the grooves; however, this is not considered necessary. The splash preferably is deposited or fed into the cut grooves or slits until they are completely filled and overflowing, the amount of splash employed being approximately 0.5% to 5% by weight of the thermoplastic material, preferably about 1%. Cutting or grooving of the blanket and the addition of splash is continued for about 1 to 2 revolutions of the mill roll.

The thermoplastic blanket with its splash filled grooves or slits is then milled for about ¼ to 1 minute in order to heat the splash to a thermoplastic condition to facilitate its mixing and adherence, and to slightly disrupt or distort the uniform pattern of evenly spaced parallel lines consisting of the splash filled grooves. This esthetically necessary slight disruption or disturbance of the lines may be obtained by one of several different techniques. The preferred technique or method is to initially form a thermoplastic blanket 16 on the front mill roll 3, either by depositing an exact amount of thermoplastic material or by subsequent adjustment, as previously described with a bank 17 formed in the nip of the mill prior to cutting, and followed by adding splash to the blanket, then by brief milling, for about 1 to 3 revolutions at normal milling speeds, subsequent to the cutting and the addition of splash, so as to heat-soften the material and provide a gentle and controlled mixing action resulting in proper disruption or disturbance of the uniform pattern. It is to be noted that in the foregoing preferred method, the most advantageous bank size, that is between ½ and 4 inches of nip height, depends upon the chraacteristics of the blanket, such as its temperature, consistency, thickness or distance between the mill rolls etc.

An alternative technique or method of slightly disrupting or disturbing the uniform pattern of added splash is either to form the thermoplastic blanket on the front mill roll with only a minimum or no bank in the nip of the rolls, or subsequently to reduce the bank to a minimum or to eliminate it prior to cutting or adding splash. Following the cutting and addition of splash, the blanket 16 is milled at high speeds for about ¼ to 1 minute whereby in addition to heating of the splash, a slight but satisfactory mixing action is obtained as a result of throwing of the blanket or slab against the back mill roll by the centrifugal action of the front mill roll.

With either technique, the blank is kept relatively small or within a certain defined upper limit to keep the bands of splash, running generally circumferentially, from losing their general directional characteristics, as might happen if they were required to pass through a large mass of milling, churning material.

The blanket of thermoplastic material prepared in accordance with either of the techniques described in the foregoing may then be removed from the front mill roll 3 and its manufacture completed in a conventional manner. Typically, the blanket is placed on conveyor 19, preferably folded once transversely, turned 90 degrees and calendered between rolls 21 and 22 of calender 20 to a suitable thickness, preferably calendering twice between two sets of such calender rolls.

The foregoing described method or procedure, in particular the controlling of the amount of bank in the nip of the mill, forming spaced grooves or openings in the blanket and filling the same with color imparting splash, and subsequently milling in a manner to slightly disrupt or distort the uniform pattern, produces a new and consistently uniform color design or configuration which is substantially identical to the fine veining or graining of natural marble. Furthermore, among other advantages, the method results in a material saving in splash usage, reduces color poisoning to a minimum, and, due to the consistent and uniform production of the design, results in a high rate of recovery.

The apparatus, or means of practicing the procedures of this invention, comprises a suitable mill in combination with means for cutting spaced grooves or slits in the material on one roll of the mill and means for applying splash to the grooves of the material. The drawings, particularly FIGS. 1 and 2, illustrate a two roll mill in combination with one means for carrying out the invention. The preferred apparatus of this invention consists of a plurality of spaced parallel cutting means such as knives 5, illustrated in FIGS. 1 and 2, or discs 5a or the like, illustrated in FIG. 4, mounted on movable support means 6, or 6a (FIG. 4), the support means being adapted to move said cutting means away from, or forward substantially into contact, but short of actual contact, with the front roll 3. It is highly desirable and preferred that the cutting means be so located and adjusted as to cut substantially completely through or entirely through any material on the roll 3 when in their forward position. However, the cutting means should not be permitted to actually contact the roll 3 so as to dull them or score the roll. The cutting means are preferably about 1/16 to 1/4 of an inch in width and are spaced approximately 1/4 to 1 inch apart, and may consist of knives, discs or any other means capable of producing a clean cut groove or slit about 3/32 to 1/2 of an inch in width. The discs 5a, shown in FIG. 4, are considered the preferred cutting means and it is desirable that they be free turning on the supporting shaft 6a, or other supporting means, since their rotation facilitates their clean or sharp cutting action which reduces distortion of the blanket and accumulation of material between and on the discs.

Mounted above the front roll 3 of the mill 1 at a point at or beyond the ends of the cutting means is a splash supply or distributing device, such as the illustrated hopper or bin 7, provided with multiple feed means, such as holes or orifices 8 of approximately 3/32 to 1/8 inch in diameter. The splash supply and distributing device, e.g. hopper 7, is located in such a position that each of its feed or discharge means is directly above and in line with each cutting means or the grooves or slits produced thereby, whereby powdered splash discharged by the distributor may be fed by gravity flow or mechanical means into each of said cut grooves or slits. Means such as, for example, a closure device 11 and securing clips 12 should be provided for the feed means or openings 8 in order to control the splash flow. The distributing device 7 may be divided by partitions 10 in order to provide means for separately feeding and controlling the addition of one or more colors of powdered splash material. However, it is to be understood that any suitable means for feeding a granular material into an exact location, for example, any reservoir or supply container provided with feed control means such as divided or channelled vibrating trays, valve means, etc., are within the scope of this invention.

The following examples illustrate the preferred procedures for the production of floor tile having the fine veining or graining of natural marble. It is to be understood, of course, that the method and means of producing and the composition of the floor tile are exemplary and are not to be considered to limit the invention to the particular composition or operating conditions outlined.

*Example I*

A batch of conventional vinyl floor tile base material, containing vinyl resin, plasticizers, asbestos fiber, fillers and pigments, was prepared by heating and mixing in a Baker-Perkin's mixer. After about 15 minutes, the ingredients being sufficiently mixed and thermoplastic to work on a mill, the batch was transferred to an ordinary two roll rubber mill. The batch was milled about 3 minutes to bring its internal temperature up to 245–250° F., and to form a continuous blanket or slab around the front roll of the mill about 1/2 inch thick, the approximate distance between the mill rolls, and to accumulate excess material in the nip betwen the rolls. Sufficient material was removed by a doctor knife, as well understood in the art, until a 2 inch bank remained in the nip between the rolls. A multiplicity of 1/8 inch wide discs tapered to a 1/32 inch cutting edge, spaced 3/8 of an inch apart on centers, and extending across the front mill roll was forced by mechanical means substantially entirely through the revolving slab of thermoplastic material on the front mill roll. Simultaneously, about 1.3% by weight of the base material of powdered vinyl splash, sized approximately betwen 40 and 200 mesh, and of a color different from that of the base material, was applied uniformly by mechanical means from an overhead hopper to fill the grooves cut by the discs for two mill revolutions. The uniformity of the vertical grooves containing the colored splash was somewhat destroyed during the ensuing 2 mill revolution by the 2 inch bank at normal mill speeds, that is approximately 10 r.p.m. The slab was then doctored off, folded once, turned 90 degrees, and compressed to a finished tile gauge of 1/16 inch by calendering through two sets of calender rolls in the conventional manner. The resulting product was cut into standard 9 x 9 inch tiles and each contained the fine veining or graining of natural marble.

The recovery of acceptable tile was 71% out of a possible 74%, high recovery being one of the main features of this controlled process. Also, splash usage was only 1.3% by weight of the base material in contrast to about 4–6% by weight in the production of conventional "marbleized" tile.

*Example II*

A conventional vinyl floor tile base mixture, identical to that of Example I, was prepared in the standard manner by heating and mixing the ingredients in a Baker-Perkin's mixer for about 15 minutes. A batch of the thusly prepared mix was then deposited on a two roll rubber mill and further mixed and heated by milling for about 3 minutes, as is common in the art. The milling resulted in the formation of a continuous blanket or slab about the front mill roll, of a depth approximately equivalent to the distance between the mill rolls, and with the excess material accumulated in the nip of said rolls. Excess material was then cut off until approximately a 1 inch bank remained in the nip of the rolls. At this point a plurality of cutting knives, spaced 3/8 of an inch apart and 1/8 of an inch wide tapered to a 1/32 inch cutting edge, was forced into the slab on the front roll of the mill to cut spaced vertical grooves, tangent to the said roll, substantially all the way through the slab. Simultaneously, about 0.5% by weight of the base material of powdered splash material, sized approximately between 40 and 200 mesh, of a color different from that of the base was gravity fed from an overhead supply into each of the said cut grooves for about two revolutions of the mill running at the rate of 10 r.p.m. After splash application, the mill speed was increased to 20 r.p.m. for about 1/2 minute to consolidate the splash powder with the base material and to slightly destroy the uniformity of the vertical lines on the mill slab. The slab was then removed from the mill roll, folded once, turned 90 degrees, and calendered twice in a conventional manner to produce a 1/16 inch gauge slab of floor tile material. The slab was finally cut into standard 9 x 9 inch tiles.

Each tile produced by the above described run was uniformly designed substantially through with fine veining or graining closely resembling natural marble. The tile recovery (the amount of usable tile) ran about 70% out of a possible 74%, the maximum recovery after allowing for the frames from which the tiles are cut.

The process and apparatus disclosed herein produce an attractive graining or veining which simulates natural marble, and the article has utility in its original sheet form, or it may be cut into tiles, blocks, etc., of any desired dimensions. The designed plastic material of this invention is suitable for use as surface covering for floors, walls, work surfaces, such as desks, counters, etc., and the like.

The details given are for the purpose of illustration, not limitation, and variations within the spirit of the invention are intended to be included in the scope of the appended claims.

What I claim is:

1. A method of producing veined thermoplastic surface covering materials resembling natural marble which comprises cutting a plurality of individual grooves spaced from each other in a blanket of thermoplastic material, adding pieces of splash to the said grooves to form a relatively uniform design pattern in the thermoplastic material, distorting somewhat the uniform design pattern, and calendering the thermoplastic material.

2. A method of producing veining resembling natural marble in thermoplastic surface covering materials which comprises, cutting a plurality of individual grooves spaced from each other in a blanket of thermoplastic material, adding particles of splash to the said grooves, milling the blanket of thermoplastic material and calendering the same.

3. A method of producing veining resembling natural marble in thermoplastic surface covering materials which comprises cutting a plurality of spaced grooves in a blanket of thermoplastic material on a mill roll, adding granular splash to the said grooves, milling the blanket of thermoplastic material and calendering the same.

4. A method of producing the veining of natural marble in thermoplastic surface covering materials which comprises milling a mass of thermoplastic material to to form a continuous blanket of the said material about one mill roll, removing any excess material in order to minimize its banking between the rolls, cutting a plurality of spaced grooves in the blanket of thermoplastic material on the mill roll, adding granular splash to the said grooves, milling the blanket of thermoplastic material and calendering the same.

5. A method of producing the veining of natural marble in thermoplastic surface covering materials which comprises milling the mass of thermoplastic material to form a continuous blanket of the material about one mill roll, adjusting the amount of any excess material on the mill in order to reduce its banking height between the mill rolls to not more than approximately a 4 inch bank measured from the common tangent to the rolls, cutting a plurality of spaced grooves in the blanket on the mill roll, adding granular splash to the said grooves, milling the blanket of thermoplastic material and calendering the same.

6. A method of producing the veining of natural marble in thermoplastic surface covering materials which comprises depositing a mass of thermoplastic material on mill rolls in an amount sufficient to form a continuous blanket of material about one roll, milling the material, cutting a plurality of spaced grooves in the blanket on the mill roll, adding granular splash to the said grooves, milling the blanket of thermoplastic material and calendering the same.

7. A method of producing the veining of natural marble in thermoplastic surface covering materials which comprises depositing a mass of thermoplastic material on mill rolls in an amount sufficient to form a continuous blanket of the material about one roll, milling the material, adjusting the amount of any excess material on the mill in order to reduce its banking between the mill rolls to a predetermined workable height, cutting a plurality of spaced grooves in the blanket on the mill roll, adding granular splash to the said grooves, milling the blanket of thermoplastic material and calendering the same.

8. A method of producing the veining of natural marble in thermoplastic surface covering materials which comprises depositing a mass of thermoplastic material upon mill rolls in an amount sufficient to form a continuous blanket of the material about one roll, milling the material, adjusting the amount of any excess material on the mill in order to reduce its banking between the mill rolls to a predetermined workable height, cutting a plurality of spaced parallel grooves in the blanket of thermoplastic material tangent to the mill roll, adding granular splash to the said grooves sufficient at least substantially to fill the same, milling the blanket of thermoplastic material and added splash, and calendering the same.

9. A method of producing the veining of natural marble in thermoplastic surface covering materials which comprises depositing a mass of thermoplastic material upon mill rolls in an amount sufficient to form a continuous blanket of the material about one roll, milling and adjusting the amount of any excess material on the mill roll in order to reduce its banking between the mill rolls to a relatively small bank, cutting a plurality of spaced parallel grooves substantially through the blanket tangential to the mill roll, filling each of the said cut grooves with finely ground splash, milling the thermoplastic material and added splash, cutting the blanket of thermoplastic material from the mill roll and calendering the same.

10. A method of producing the veining of natural marble in thermoplastic surface covering materials which comprises depositing a mass of thermoplastic material upon mill rolls in an amount sufficient to form a continuous blanket of the material about one roll, milling and adjusting the amount of any excess material on the mill in order to reduce its banking between the mill rolls to a relatively small bank, cutting a plurality of parallel grooves approximately $3/32$ to $1/2$ inch wide substantially through the blanket of thermoplastic material and spaced about $1/4$ to 1 inch apart tangential to the mill roll, filling each of the said cut grooves to overflowing with from approximately 0.5% to 5% by weight of the thermoplastic material of finely ground splash, cutting and adding splash for approximately 1 to 2 revolutions of the mill, milling the material and added splash for approximately $1/4$ to 1 minute, cutting the blanket of material from the mill and calendering the same.

11. A method of producing the veining of natural marble in thermoplastic surface covering materials which comprises depositing masses of thermoplastic material upon mill rolls in an amount sufficient to form a continuous blanket of the material about one roll, milling and adjusting the amount of any excess material on the mill in order to reduce its banking between the mill rolls to a relatively small bank, cutting a plurality of parallel grooves approximately $3/32$ to $1/2$ inch wide substantially through the blanket of thermoplastic material and spaced about $1/4$ to 1 inch apart tangential to the mill roll, filling each of the said cut grooves to overflowing with from approximately 0.5% to 5% by weight of the thermoplastic material of finely ground splash, cutting and adding splash for approximately 1 to 2 revolutions of the mill, milling the material and added splash for approximately $1/4$ to 1 minute, cutting the blanket of material from the mill, folding the material, turing the folded material 90 degrees, and calendering the same.

12. In a device for the manufacture of thermoplastic surface covering materials, said device including mill rolls to mill the thermoplastic material into a blanket, a plurality of spaced cutting means movably mounted adjacent to one of the rolls of said mill and mounted relative thereto so as to cut a plurality of spaced grooves substantially through a blanket of material on the adjacent roll and means for discharging particles of splash adjacent the spaced cutting means, whereby the splash will be fed into the grooves cut into a blanket of material on the mill roll.

13. In a device for the manufacture of thermoplastic surface covering materials, said device including two mill rolls adapted to mill the thermoplastic material into a blanket, a plurality of parallel cutting means each approximately $1/16$ to $1/4$ inch in width and spaced approximately $1/4$ to 1 inch apart movably mounted adjacent to one of the rolls of said mill and mounted relative thereto so as to cut a plurality of spaced grooves substantially through the blanket of material on the adjacent roll and tangential to the same roll and a hopper for discharging finely ground splash through a plurality of feed means adjacent each spaced cutting means, whereby the splash will be discharged into each of the grooves cut into a blanket of material on the mill roll.

14. In a device for the manufacture of thermoplastic surface covering materials, the combination of a two roll mill, means including a plurality of spaced cutting elements for cutting a plurality of spaced grooves and movably mounted adjacent to one of the said mill rolls, and means to discharge granular splash adjacent each of said cutting elements.

15. In a device for the manufacture of thermoplastic surface covering materials, the combination of a two roll mill, means movably mounted adjacent to one of said mill rolls for cutting a plurality of spaced parallel grooves, said means consisting of a plurality of cutting blades each approximately 1/16 to 1/4 inch in width and spaced approximately 1/4 to 1 inch apart and means adapted to discharge finely ground splash adjacent each cutting blade whereby the granular material may be fed into grooves opened by the cutting means.

References Cited in the file of this patent

UNITED STATES PATENTS

| | | |
|---|---|---|
| 644,810 | Sylvester | Mar. 6, 1900 |
| 2,091,361 | Heppes | Aug. 31, 1937 |
| 2,164,058 | Fowler | June 27, 1939 |
| 2,274,907 | Madala | Mar. 3, 1942 |
| 2,341,062 | Alvey | Mar. 16, 1943 |
| 2,369,866 | Spencer | Feb. 20, 1945 |